United States Patent [19]

Takizawa

[11] Patent Number: 5,640,883
[45] Date of Patent: Jun. 24, 1997

[54] INDUSTRIAL ROBOT

[75] Inventor: Hiroshi Takizawa, Ibaragi, Japan

[73] Assignee: Sony Corporation, Tokyo, Japan

[21] Appl. No.: 420,643

[22] Filed: Apr. 12, 1995

[30] Foreign Application Priority Data

Apr. 21, 1994 [JP] Japan .................... 6-105948

[51] Int. Cl.⁶ ............................................. B25J 18/00
[52] U.S. Cl. ............................. 74/490.04; 901/21
[58] Field of Search ............... 74/490.04; 901/15, 901/21; 414/744.5

[56] References Cited

U.S. PATENT DOCUMENTS

| | | | |
|---|---|---|---|
| 4,682,932 | 7/1987 | Yoshino | 901/21 |
| 4,706,515 | 11/1987 | Yasukawa | 74/490.04 |
| 5,271,292 | 12/1993 | Sawada et al. | 901/21 |
| 5,314,293 | 5/1994 | Carlisle et al. | 414/744.5 |

FOREIGN PATENT DOCUMENTS

| | | | |
|---|---|---|---|
| 0216786 | 8/1989 | Japan | 414/744.5 |

Primary Examiner—Allan D. Herrmann
Attorney, Agent, or Firm—Jay H. Maioli

[57] ABSTRACT

An industrial robot provides precision control of a rotating axis without generating fluctuations in rotating axis direction during movement of the rotating axis due to positional movements of first and second robot arms in which the first arm is supported by a base as a center of rotation and the second arm is supported at its mid-point by the other end of the first arm. The robot includes a rotating axis, a second arm driving unit for rotating the second arm and installed at the center of rotation so that rotation relative to the base is prevented, a core shaft for supporting the first and second arms in such a way that the first and second arms can rotate relative to each other, a core shaft angle sustaining mechanism for sustaining the core shaft at constant angle of rotation relative to the base, a rotating base axis driving motor for driving the rotating axis, and a rotating axis angle driving sustaining mechanism for sustaining the angle of rotation of the rotating axis driving motor at the same value as the angle of rotation of the core shaft.

7 Claims, 5 Drawing Sheets

INDUSTRIAL ROBOT

BACKGROUND OF THE INVENTION

1. Field of the Invention

The present invention relates to an industrial robot. In particular, the present invention relates to a horizontal articulated robot of the full-earth type.

2. Description of Related Art

In general, a horizontal articulated robot comprises a base pillar, a first arm which is installed in such a way that it can rotate over a horizontal plane with a longitudinal direction end of the first arm taken as a center of rotation and the base pillar serving as a center axis, and a second arm. The second arm is installed in such a way that it can rotate over a horizontal plane with its longitudinal direction end taken as a center of rotation and the other longitudinal direction end of the first arm serving as a rotational center axis. A driving mechanism that serves as a unit for driving the second arm is generally fixed to either the second arm itself or the first arm.

In this case, the driving of the second arm by the second arm driving mechanism is affected by the movement of the first arm, giving rise to a problem that acceleration and deceleration cannot be controlled independently of each other.

As a means for solving this problem, a full-earth type robot has been proposed. The full-earth type robot is disclosed in Japanese Patent application Nos. 06-68192 and 06-64339 with their corresponding patent application Ser. No. 08/396,719 filed in the U.S. on Mar. 1, 1995.

In the case of a full-earth type robot, the second arm driving unit for driving the second arm is fixed to neither the first nor second arm. Instead, such a robot has a configuration wherein the second arm driving unit is fixed to a base in an attempt to reduce the influence of the first arm on the movement of the second arm.

In addition, the full-earth type robot described above in general has an RZ shaft at the end of the second arm. The RZ shaft is also known as a working shaft typically used for installing an RZ tool. The RZ tool expands and contracts in the vertical (or Z) direction and, at the same time, rotates itself in the R direction. Normally, a driving mechanism for driving the RZ shaft is fixed on the second arm.

In the case of the full-earth type robot described above, however, the entire driving mechanism of the RZ shaft is installed on the second arm. Accordingly, in order for the position angle of the R axis of the second arm to sustain an absolutely constant positional relation regardless of the positions of the first and second arms, control must be exercised to correct the position angle of the R axis depending upon the positions of the first and second arms.

Such control thus becomes complicated and, on top of that, the direction of the R axis may vary during its movement accompanying changes in position of the first and second arms due to, among other causes, a lag occurring in the servo control. As a result, inconvenience is encountered in carrying out the precision control of the R axis.

SUMMARY OF THE INVENTION

It is an object of the present invention to solve the problems described above by providing an industrial robot which can be used for implementing the precision control of the rotating axis serving as a working shaft wherein, through cancellation of positional relations of the rotating axis to the first and second arms by each other, no fluctuations in rotating axis direction are generated during the movement of the rotating axis due to the positional movements of the first and second arms.

In accordance with one aspect of the present invention, an industrial robot is equipped with:

a base;

a first arm supported by the base and rotatable over a horizontal plane with one longitudinal direction end of the first arm taken as a center of rotation;

a second arm supported by the other longitudinal direction end of the first arm;

a rotating axis set in the vertical direction on a longitudinal direction end of the second arm;

a second arm driving unit used for rotating the second arm and installed at approximately the center of rotation of the first arm in such a way that rotation relative to the base is prevented;

an axis core used for supporting the first and second arms in such a way that the first and second arms can rotate freely;

core shaft angle sustaining means for sustaining the axis core at a constant angle of rotation relative to the base;

rotating axis driving means used for driving the rotating axis and provided on the second arm in such a way that the rotating axis can rotate freely; and rotating axis driver angle sustaining means for sustaining the angle of rotation of the rotating axis driving means at the same value as the angle of rotation of the axis core.

In accordance with another aspect of the present invention, an industrial robot is equipped with:

a base;

a first arm supported by the base and rotatable over a horizontal plane with one longitudinal direction end of the first arm taken as a center of rotation;

a second arm supported by the other longitudinal direction end of the first arm;

a rotating axis set in the vertical direction on a longitudinal direction end of the second arm;

a second arm driving unit used for rotating the second arm and installed at approximately the center of rotation of the first arm in such a way that rotation around the base is prevented;

an axis core used for supporting the first and second arms in such a way that the first and second arms can rotate freely;

core shaft angle sustaining means for sustaining the axis core at a constant angle of rotation relative to the base;

axial direction driving means used for driving the rotating axis in its axial direction and provided on the second arm in such a way that the axial direction driving means can rotate freely; and axial direction driver angle sustaining means for sustaining the angle of rotation of the axial direction driving means at the same value as the angle of rotation of the axis core.

It is desirable to equip the core shaft angle sustaining means of the industrial robot provided by the present invention with:

a base-fixed pulley with its center approximately coinciding with the first arm's axis of rotation over the base;

a planet pulley installed on the axis core; and an earth belt wound around the base-fixed pulley and the planet pulley.

In addition, it is also desirable to equip the rotating axis driver angle sustaining means of the industrial robot with:

a rotating axis direction regulating pulley provided on the rotating axis driving means;

a direction regulating pulley installed on the axis core; and a rotating axis direction regulating belt wound around the rotating axis direction regulating pulley and the direction regulating pulley.

It is desirable to further equip the axial direction driver angle sustaining means of the industrial robot with:

an axial direction regulating pulley provided on the axial direction driving means; and an axial direction regulating belt wound around the direction regulating pulley and the axial direction regulating pulley.

In the configuration described above, the core shaft has a function of transferring information on the magnitude of a fixed angle of rotation relative to the base to be used as a reference to the inside of the second arm and, at the same time, works as a mechanism for supporting the first and second arms in such a way that the first and second arms can rotate freely.

The core shaft angle sustaining means has a function to sustain the core shaft at the fixed angle of rotation relative to the base.

The rotating axis driving means, which is provided on the second arm in such a way that the rotating axis driving means can rotate freely, has a function to rotate the rotating axis. The rotating axis driver angle sustaining means sustains the angle of rotation of the rotating axis driving means at the same value as the angle of rotation of the core shaft.

The axial direction driving means, which is provided on the second arm in such a way that its axial direction driving means can rotate freely, moves the rotating axis in its axial direction. The axial direction driver angle sustaining means sustains the angle of rotation of the axial direction driving means at the same value as the angle of rotation of the core shaft.

The rotating axis driving means and the axial direction driving means, which are provided on the second arm in such a way that these means can rotate freely, rotate and move the rotating axis while keeping angles of deviation relative to the rotation of the first arm unchanged. In this way, the rotation and the axial direction movement of the rotating axis, which serves as a working shaft, can be controlled without changing the positions of the first and second arms.

All these functions result in cancellation of the positional relations of the rotating axis to the first and second arms by each other, the cancellation in turn eliminates fluctuations in rotating axis direction occurring during the movement of the rotating axis due to the positional movements of the first and second arms.

DETAILED DESCRIPTION OF THE PREFERRED EMBODIMENTS

The present invention will become apparent from the following detailed description of preferred embodiments with reference to accompanying diagrams.

It should be noted that the embodiments described below are no more than preferred actual examples of implementations of the present invention, each such example having a variety of limitations deemed desirable as seen from the technical point of view. However, the scope of the present invention is not limited by the limitations imposed on the embodiments unless otherwise particularly specified in the following description.

Figure 1:
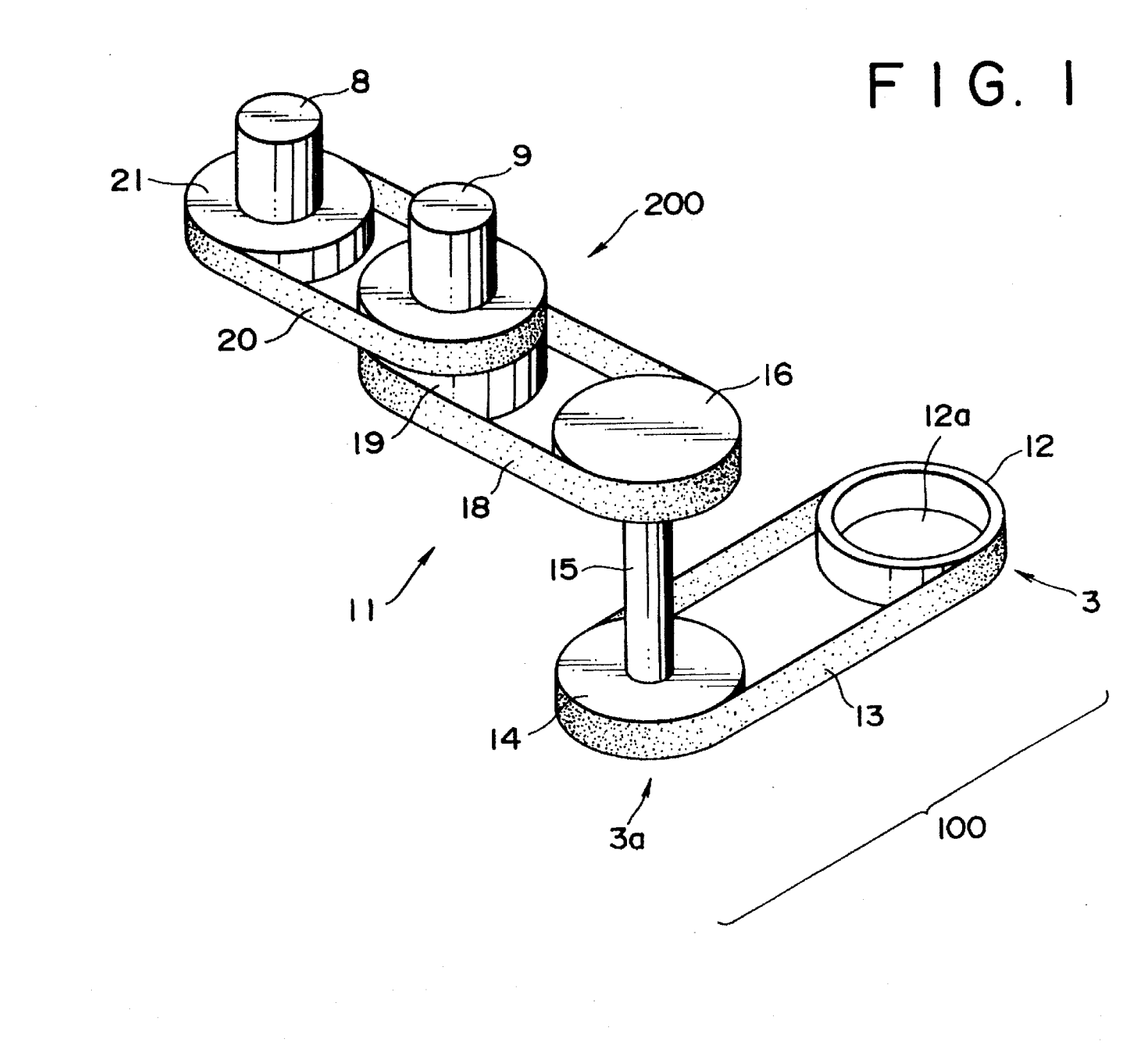
FIG. 1 is a diagram showing core shaft angle sustaining means and rotating axis driver angle sustaining means employed in a preferred embodiment implementing an industrial robot in accordance with the present invention.
Figure 2:
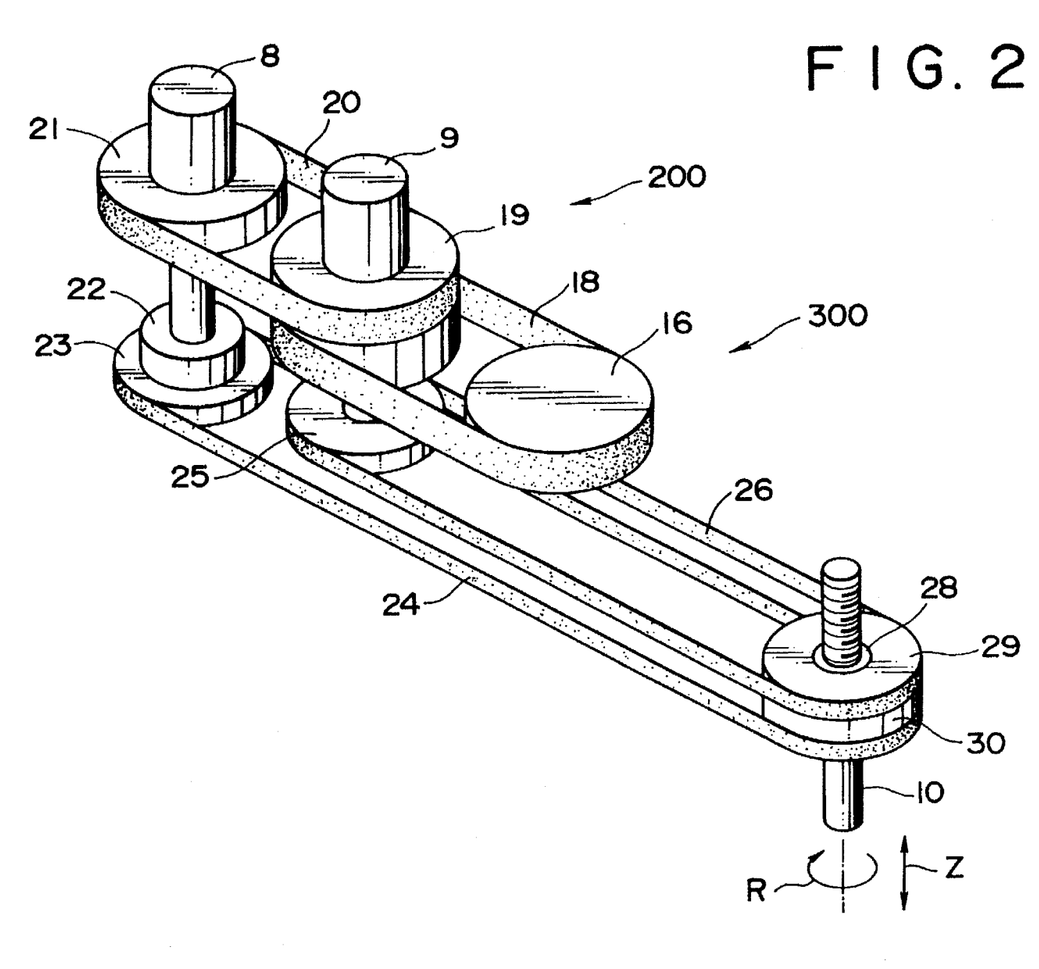
FIG. 2 is a diagram showing a working shaft, the rotating axis driver angle sustaining means and an axial direction driver angle sustaining means of a second arm.
Figure 3:
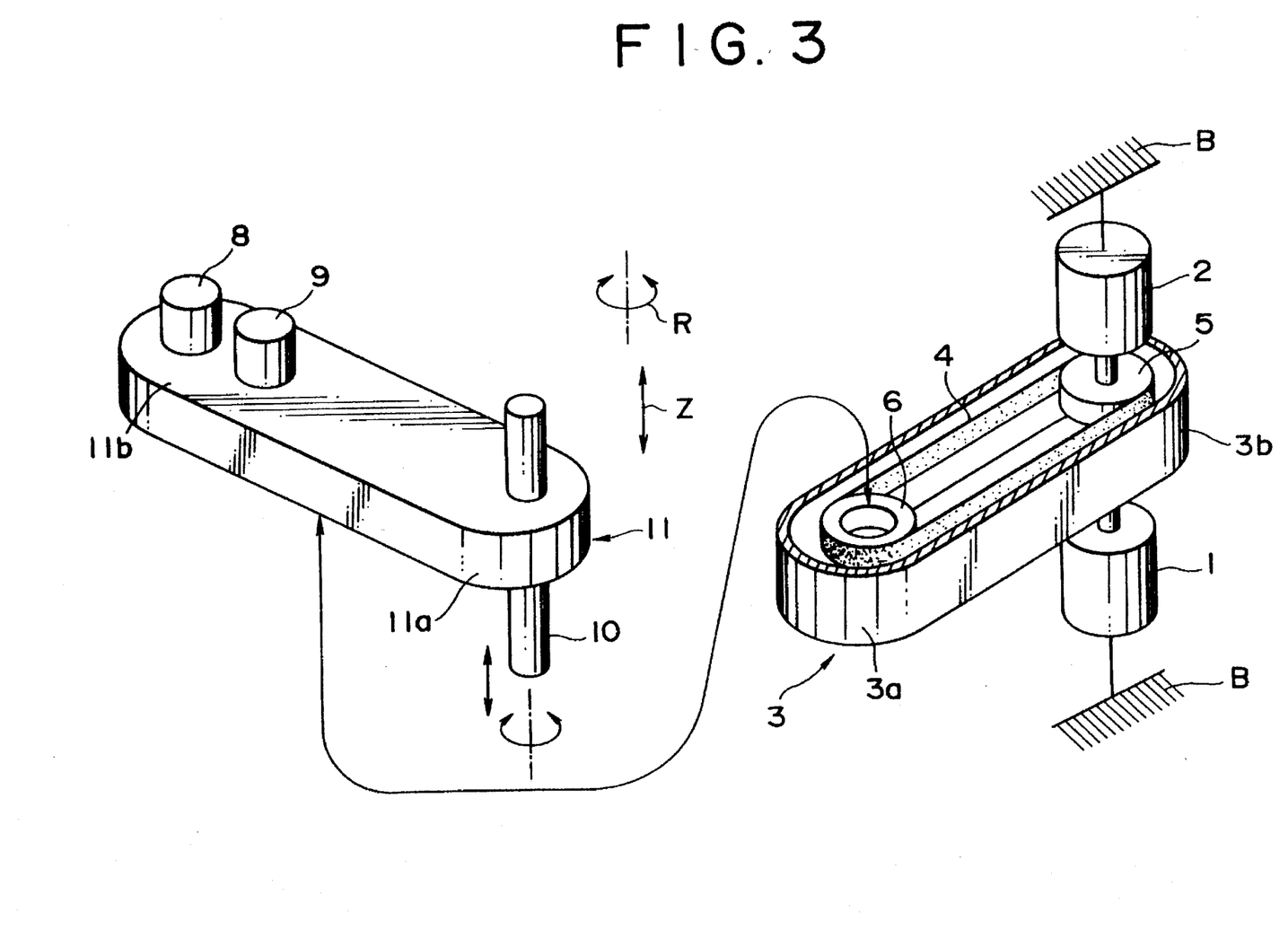
FIG. 3 is a diagram showing, among other components, driving units of a first arm and the second arm.

An embodiment implementing an industrial robot provided by the present invention is explained by referring to FIGS. 1 to 3.

FIG. 1 shows components of an embodiment implementing an industrial robot provided by the present invention such as core shaft angle sustaining means 100 and rotating axis driver angle sustaining means 200.

A working shaft 10 employed in a second arm 11, the rotating axis driver angle sustaining means 200 and axial direction driver angle sustaining means 300 are shown in FIG. 2.

FIG. 3 shows the configuration of a system for driving a first arm 3 and the second arm 11, and other components.

First of all, the first arm 3, the second arm 11 and the system for driving the first and second arms 3 and 11 are described by referring to FIG. 3.

A first arm driving unit 1 shown in the figure comprises a motor for driving the first arm 3 and a reduction mechanism. Rotating in a fixed direction relative to a base B, the first arm driving unit 1 transfers a rotating force to a driving rotation axis. The transferred driving force moves the whole first arm 3.

A second arm driving unit 2 also shown in the figure comprises a motor for driving the second arm 11 and a reduction mechanism connected to an output axis of the motor. Much like the first arm driving unit 1, the second arm driving unit 2 rotates in a fixed direction relative to the base B. A reduced driving force output by the motor is transferred to a driving-belt driving pulley 5, rotating the driving-belt driving pulley 5. The first arm driving unit 1 and the second arm driving unit 2 are both installed at an end 3b of the first arm 3.

A driving belt 4 is wound around the driving-belt driving pulley 5 and a second axis driving pulley 6. A driving force generated by the second arm driving unit 2 is transferred to the second axis driving pulley 6. A steel belt is typically employed as the driving belt 4.

The second axis driving pulley 6 is located at another end 3a of the first arm 3 and can rotate. The second axis driving pulley 6 is hollow, allowing other mechanisms to be provided inside it.

The center of the second arm 11 is fixed on the second axis driving pulley 6. The working shaft 10 is installed at an end 11a of the second arm 11. A Z-axis motor 9 and an R-axis motor 8 are employed at another end 11b, the counterpart of the working axis end 11a on the other side of the second arm 11. It is desirable to set the Z-axis motor 9 and the R-axis motor 8 above the second arm 11.

The working shaft 10 is the so-called tool mounting axis which can move in the vertical direction (or the Z direction) and rotate in the axis rotating direction (or the R direction).

A tool or the like installed on the working shaft 10 can be removed with ease.

The Z-axis motor 9 is an axial direction driving means for moving the working shaft 10 in the vertical direction (or the Z direction). On the other hand, the R-axis motor 8 is a rotating axis driving means for rotating the working shaft 10 in the axis rotating direction (or the R direction).

Next, the principle of operation of a system for driving these components is explained by referring to FIG. 3.

The first arm driving unit 1 transfers a rotating force to the first arm 3, causing the first arm 3 to rotate with the first arm driving unit 1 taken as a center of rotation.

On the other hand, the second arm driving unit 2 rotates at the same phase as the first arm driving unit 1. Accordingly, the posture of the second arm 11 does not vary due to the rotation of the first arm 3.

That is to say, the driving-belt driving pulley 5 is rotated by the second arm driving unit 2, transferring a rotating force to the second axis driving pulley 6 with the driving belt 4 serving as a force transferring means. The second axis driving pulley 6 is rotated accordingly. The rotation of the second axis driving pulley 6 allows the second arm 11 fixed or attached on the second axis driving pulley 6 to rotate.

A mechanism on the second arm 11, which mechanism is not shown in the figure, allows the rotation of the R-axis motor 8 to rotate the working shaft 10. In addition, the Z-axis motor 9 drives the working axis 10 to move up and down in the Z direction.

Next, a means for regulating the postures of the R-axis motor 8 and the Z-axis motor 9 is described by referring to FIG. 1. The R-axis motor 8 and the Z-axis motor 9 are installed in such a way that they can rotate freely regardless of the posture of the second arm 11.

FIG. 1 shows the core shaft angle sustaining means 100, the rotating axis driver angle sustaining means 200 and the axial direction driver angle sustaining means 300 employed in an embodiment implementing an industrial robot provided by the present invention.

First of all, the core shaft angle sustaining means 100 is described.

The core shaft angle sustaining means 100 is a means for sustaining the core shaft, a planet shaft denoted by reference numeral 15, at a fixed angle of rotation relative to the base B shown in FIG. 3.

A base-fixed pulley 12, an earth belt 13 and a planet pulley 14 are embedded inside the first arm 3 shown in FIG. 3.

The planet shaft 15 is embedded inside the rotating axis of the second arm 11 supported at the end 3a of the first arm 3. Portions other than that are embedded inside the second arm 11.

The base-fixed pulley 12 is in a fixed positional relation with the base B shown in FIG. 3. As shown in the figure, a concentric circular hole 12a is drilled through the center of the base-fixed pulley 12, enclosing, among other components, the first arm driving unit 1 of FIG. 3 described earlier. The earth belt 13 is a timing belt, a toothed belt wound around the base-fixed pulley 12 and the planet pulley 14.

The planet pulley 14 is a pulley located at approximately the end 3a of the first arm 3. The planet shaft 15 is installed at the center of the planet pulley 14. The planet shaft 15, which is also known as the core shaft, holds the planet pulley 14 and an earth pulley 16 together, allowing the planet pulley 14 and the earth pulley 16 to rotate as a single body.

Means 200 For Sustaining Driver's Angle For Rotary Shaft

Next, the rotating axis driver angle sustaining means 200 is described. The rotating axis driver angle sustaining means 200 is a means for sustaining the angle of rotation of the R-axis motor 8, which serves as rotating axis driving means, at the same value as the angle of rotation of the planet shaft 15, the core axis described above.

The earth pulley 16 is a pulley for regulating a direction. A belt 18 is wound around the earth pulley 16. Regulating the Z direction, a pulley 19 holds the Z-axis motor 9 at the center of the pulley 19.

The belt 18 is wound around the pulley 19 and the earth pulley 16 so that the rotation of the earth pulley 16 causes the pulley 19 to rotate synchronously.

This belt 18 is also called a Z direction or rotating axis direction regulating belt. A belt 20 is wound around the pulley 19 and a pulley 21 for regulating the R direction.

The belt 20 is a belt for regulating the rotating axis direction. The R-axis motor 8 is fixed on the center of the pulley 21 which serves as a pulley for regulating the rotating axis direction.

Driver Along Axial Direction

Next, the axial direction driver angle sustaining means 300 is explained. The axial direction driver angle sustaining means 300 is a means for sustaining the angle of rotation of the Z-axis motor 9 serving as an axial direction driving means at the same value as the angle of rotation of the planet shaft 15 which serves as the core shaft described above.

The axial direction driver angle sustaining means 300 comprises the pulley 19 and the belt 18.

Next, a mechanism for transferring motive power from the R-axis motor 8 and the Z-axis motor 9 to the working shaft 10, also referred to as the rotating axis, is described by referring to FIG. 2. The whole mechanism shown in the figure is accommodated inside the second arm 11.

An input axis of R-axis reduction gears 22 is linked to an output axis of the R-axis motor 8. The output axis of the R-axis motor 8 is fixed to the rotating axis of an R-axis driving pulley 23. In this arrangement, the R-axis reduction gears 22 therefore reduce the rotation of the R-axis motor 8 at a predetermined ratio, transferring the reduced rotation to the R-axis driving pulley 23.

The output axis of the R-axis motor 8 rotates, moving an R-axis driving belt 24 wound around the R-axis driving pulley 23.

An output axis of the Z-axis motor 9 is directly fixed to the rotating axis of a Z-axis driving pulley 25 around which a Z-axis driving belt 26 is wound. The other end of the Z-axis driving belt 26 is wound around a pulley 29 which is thus rotated by the output of the Z-axis motor 9. The pulley 29 has a female screw formed thereon.

The other end of the R-axis driving belt 24 is wound around a pulley 30 engaged with a spline shaft. With this arrangement, the output axis of the R-axis motor 8 rotates, causing the spline shaft engaged pulley 30 to rotate at a predetermined reduction ratio.

A female screw 28 is fixed at the center of rotation of the female screw pulley 29. The female screw 28 allows a screw portion of the working shaft 10 to be screwed on thereto. Driven by the Z-axis motor 9, the female screw 28 rotates, moving the working shaft 10 up and down in the Z direction.

A spline engagement portion, not shown in the figure, is fixed on the center of rotation of the spline shaft engaged pulley 30. Driven by the R-axis motor 8, the spline shaft engaged pulley 30 rotates, causing the working shaft 10 to rotate around its axial center in the R direction.

Next, the operation of the configuration described above is explained.

Let us consider a case in which the first arm 3 of FIG. 3 employed in the embodiment implementing an industrial robot provided by the present invention is moving.

Since the base-fixed pulley 12 shown in FIG. 1 is fixed on the base B shown in FIG. 3, the angle of rotation of the planet pulley 14 with the earth belt 13 wound around it and the angle of rotation of the planet shaft 15 fixed on the planet pulley 14 are not changed by the movement of the first arm 3 regardless of the posture of the first arm 3.

The direction of the earth pulley 16 fixed on the planet axis 15 is also unchanged. Accordingly, the pulley 19, which is coupled to the earth pulley 16 through the wounding of the belt 18, is also moving in a fixed direction regardless of the posture of the first arm 3.

As a result, since the Z-axis motor 9 is fixed on the center of rotation of the pulley 19, the orientation of the Z-axis motor 9 in the axial center direction is fixed regardless of the posture of the first arm 3.

Likewise, the pulley 21, which is coupled with the pulley 19 through the wounding of the belt 20, is oriented in a fixed direction regardless of the posture of the first arm 3. As a result, since the R-axis motor 8 is fixed on the center of rotation of the pulley 21, the R-axis motor 8 is also oriented in a fixed direction. In addition, the R-axis reduction gears 22 and the R-axis driving pulley 23, the driving axis of which is joined to the axis of the R-axis motor 8 shown in FIG. 2 are also oriented in a fixed direction regardless of the posture of the first arm 3. Furthermore, the spline shaft engaged pulley 30 is set at a predetermined angle of rotation through the R-axis driving belt 24.

As a result, in the above configuration, the direction of the working axis 10 is always fixed regardless of the posture of the first arm 3. In addition, the working shaft 10 can be controlled to rotate by a predetermined angle by the operation of the R-axis motor 8, the output of which is transferred to the working shaft 10 through, among other components, the R-axis reduction gears 22. In this way, the working shaft 10 can be positioned at any arbitrary angle of rotation.

On the other hand, the Z-axis motor 9 is fixed on the axis of the pulley 19. Accordingly, the rotation of the Z-axis motor 9 causes the pulley 19 to rotate as well. The rotating force of the pulley 19, in turn, rotates the female screw pulley 29 through the Z-axis driving belt 26. As a result, the female screw 28 rotates, moving up and down the working shaft 10 screwed on to the female screw 28.

Let us consider a case in which the first arm 3 is moving with the R-axis motor 8 and the Z-axis motor 9 not operating. In such a case, the R-axis motor 8 and the Z-axis motor 9 continue sustaining the angles of rotation thereof at predetermined values. As a result, neither a force in the vertical direction nor a rotating force is applied to the working shaft 10, keeping the working shaft 10 at a predetermined angle of rotation.

It should be noted that, when the R-axis motor 8 is rotating, resulting in a rotation by the working shaft 10 relative to the female screw 28, a force in either the upward or downward direction is applied to the female screw 28.

In order to avoid any inconvenience caused by the force, the Z-axis motor 9 needs to be moved, accompanying the rotation of the R-axis motor 8. That is to say, control is required so as to apply no force to the female screw 28. The control is exercised so that the female screw pulley 29 also rotates by the same angle of rotation relative to the spline shaft engaged pulley 30. The implementation of the control is thus very simple.

Figure 4:
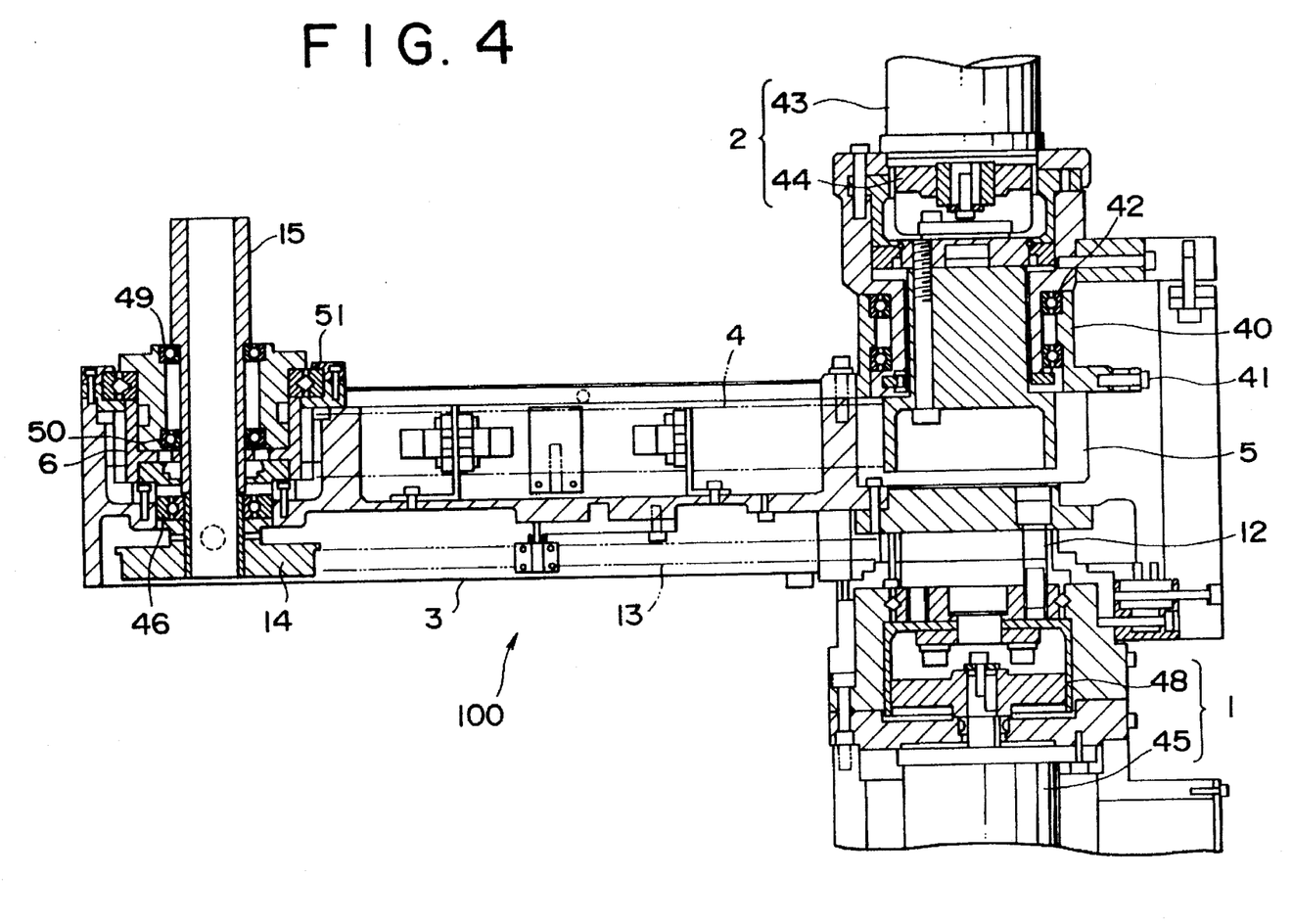
FIG. 4 is a diagram showing the mechanism of the first arm.
Figure 5:
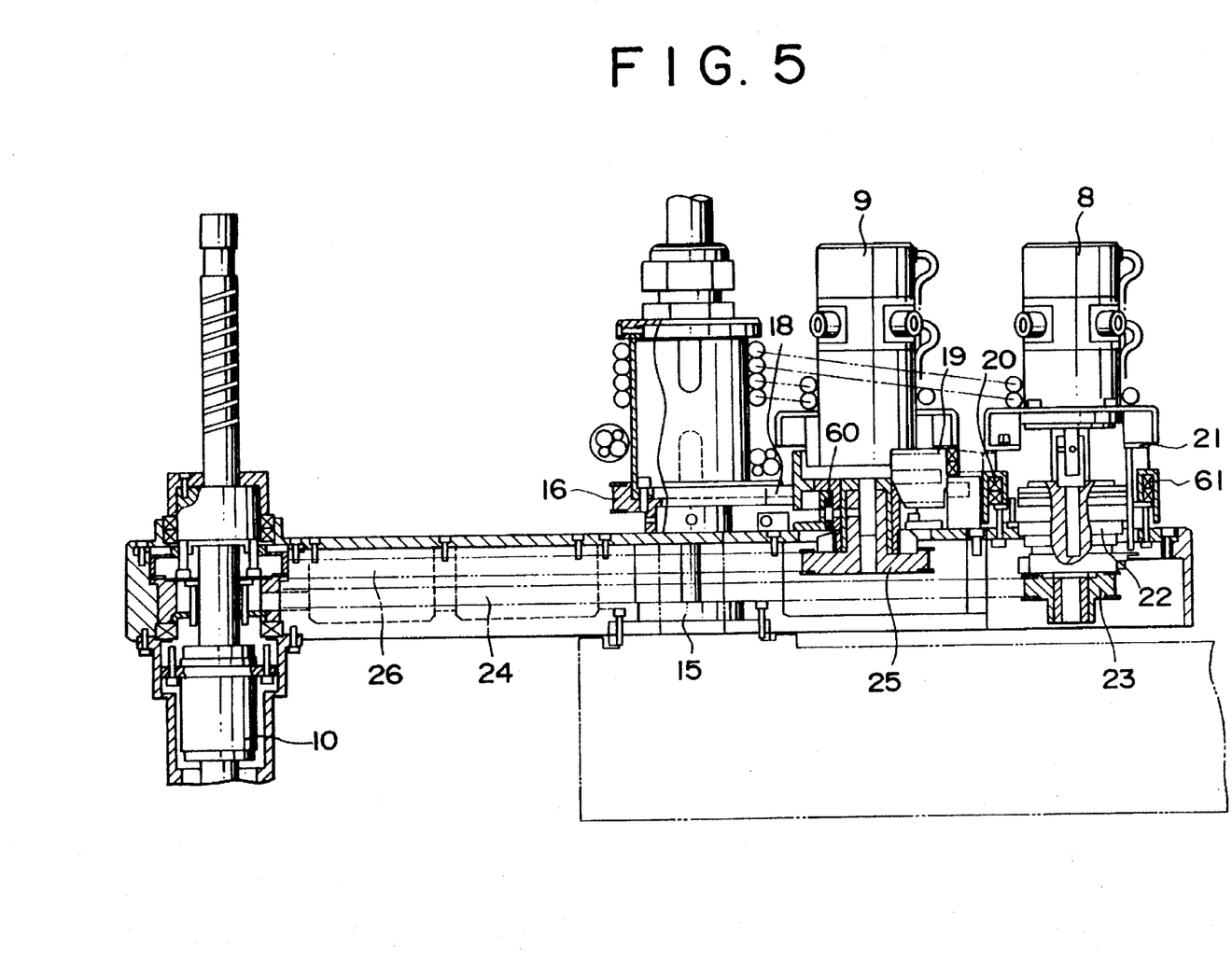
FIG. 5 is a diagram showing the mechanism of the second arm.

Next, the first arm 3, the second arm 11, the working shaft 10 and an actual example of a mechanism for sustaining their postures are described by referring to FIGS. 4 and 5.

An actual configuration of the first arm 3 employed by the embodiment of the present invention is shown in FIG. 4.

The output axis of a first arm motor 45 employed in the first arm driving unit 1 is joined to a first reduction mechanism 48, the output axis of which is connected directly to the first arm 3.

In addition, the output axis of a second arm motor 43 employed in the second arm driving unit 2 is joined to a second reduction mechanism 44, the output axis of which is connected directly to the driving-belt driving pulley 5.

Here, the first arm motor 45 and the first reduction mechanism 48 form the first arm driving unit 1 shown in FIG. 3. On the other hand, the second arm motor 43 and the second reduction mechanism 44 compose the second arm driving unit 2 also shown in FIG. 3.

The second arm driving unit 2 is attached to a second arm driver holding unit 40 through a second arm driver supporting unit 42 so that the second arm driving unit 2 is floating out off the movement by the first arm 3.

The second arm driver holding unit 40 holds the second arm driving unit 2 in such a way that the second arm driving unit 2 can rotate freely. In order to reduce the moment of inertia of the first arm 3, the second arm driver holding unit 40 is installed at approximately the center of rotation of the first arm 3.

In addition, a holding tension adjusting screw 41 is screwed on thereto in the longitudinal direction of the first arm 3. By rotating the holding tension adjusting screw 41, the second arm driving unit 2 can be moved in the longitudinal direction of the driving belt 4, allowing the tension developed in the driving belt 4 to be adjusted.

On the other hand, the earth belt 13 is wound around the base-fixed pulley 12 and the planet pulley 14. The planet shaft 15 installed at the center of rotation of the planet pulley 14 is supported by a support bearing 46 at the lower portion of the planet axis 15.

A second axis driving pulley supporting bearing 51 is provided between the first arm 3 and the second axis driving pulley 6. The second axis driving pulley supporting bearing 51 supports the second axis driving pulley 6 in such a way that the second axis driving pulley 6 can freely rotate in the first arm 3.

Bearing 49 for supporting the upper portion of a planet shaft and bearing 50 for supporting the middle portion of a planet shaft are provided between the second axis driving pulley 6 and the planet shaft 15 for supporting the planet shaft 15.

In this arrangement, the planet shaft 15 is thus supported in the first arm 3 through bearing 51 for supporting the second axis driving pulley, the second axis driving pulley 6, bearing 49 for supporting the upper portion of the planet shaft and bearing 50 for supporting the middle portion of the planet shaft.

As shown in FIG. 3, an opening is provided at the center of rotation of the second axis driving pulley 6 through which opening the planet axis 15 passes therein. The second arm 11 is directly fixed on the upper portion of the second axis driving pulley 6.

Next, a typical mechanism in the second arm 11 is described by referring to FIG. 5.

As shown in FIG. 1, the upper portion of the planet shaft 15 is installed at the center of rotation of the earth pulley 16 without engaging the planet shaft 15 with the second arm 11.

A Z-axis motor supporting bearing 60 is provided between the cabinet of the second arm 11 and the Z-axis motor 9. The Z-axis motor supporting bearing 60 is a bearing for supporting the Z-axis motor 9 in such a way that the Z-axis motor 9 can rotate freely.

An R-axis motor supporting bearing 61 is provided between the cabinet of the second arm 11 and the R-axis motor 8. The R-axis motor supporting bearing 61 is a bearing for supporting the R-axis motor 8 in such a way that the R-axis motor 8 can rotate freely.

As described earlier, the Z direction regulating belt 18 is wound around the pulley 19 and the earth pulley 16. On the other hand, the R direction regulating belt 20 is wound around the pulley 21 and the pulley 19.

A Z-axis driving pulley 25 is fixed to the driving axis of the Z-axis motor 9 whereas an R-axis driving pulley 23 is fixed to the driving axis of the R-axis motor 8 through the R-axis reduction gears 22.

By adopting the configuration described above, the mechanisms of the first and second arms 3 and 11 explained earlier can be combined with each other.

It should be noted that, in the mechanisms described above, the rotational speeds of the base-fixed pulley 12 and the planet pulley 14 shown in FIG. 1 must be equal to each other or, in other words, must have a ratio of 1 to 1. In addition, the rotational speeds of the earth pulley 16 and the pulley 19 with the belt 18 wound around them, the pulley 19 with the belt 20 wound around it as well as the pulley 21 must also be equal to each other or, in other words, have ratios of 1 to 1.

In actual terms, designing these pulleys to have as large radii as allowed by the capacities of the first and second arms will be advantageous with regards to positional accuracy.

In the embodiment provided by the present invention for implementing a full-earth type robot, the Z-axis motor 9 and the R-axis motor 8 are installed on the second arm 11 in such a way that their angles of deviation relative to the rotation of the first arm 3 remain unchanged. In this way, a robot controlling mechanism can be controlled independently of rotation angles of the first and second arms. As a result, the movements of the working shaft 10 in the Z-axis and R-axis directions can be controlled.

That is to say, the first and second arms are each connected to a floating support axis. The floating axes always have fixed angles of rotation relative to the base, allowing the positional relations of the rotating axis (R axis) to the first and second arms to be kept unchanged. In addition, the driving mechanisms of the R and Z axes together give rise to cancellation of positional relations of the rotating axis to the first and second arms by each other, allowing the precision control of the rotating axis to be implemented with no fluctuations in rotating axis direction generated during the movement of the rotating axis due to the positional movements of the first and second arms.

It should be noted that the scope of the present invention is not limited to the embodiments described thus far. For example, pulleys and belts are employed in the embodiments; however, it is also desirable to employ combinations of gears and chains or the like as driving force transferring means to replace the pulleys and belts.

As described above, the present invention allows positional relations of the rotating axis to the first and second arms to be canceled by each other. As a result, the precision control of the rotating axis can be implemented with no fluctuations in rotating axis direction generated during the movement of the rotating axis due to the positional movements of the first and second arms.

What is claimed is:

1. An industrial robot comprising:
   a base defining a horizontal plane;
   a first arm supported by said base and rotatable over the horizontal plane with a first end of said first arm in a first longitudinal direction taken as a center of rotation;
   a second arm supported at substantially a longitudinal midpoint of said second arm by a second end of said first arm in a second longitudinal direction;
   a rotating axis set in a vertical direction on a first end of said second arm in a longitudinal direction;
   an arm driving unit for rotating said second arm and installed at approximately the center of rotation of said first arm so that rotation thereof relative to said base is prevented;
   an axis core including a planet shaft for supporting said first and second arms for permitting said first and second arms to rotate relative to each other;
   core shaft angle sustaining means including a planet pulley in said first arm connected to said planet shaft and arranged for sustaining said axis core at a constant angle of rotation relative to said base;
   rotating axis driving means for driving said rotating axis and provided on said second arm; and
   rotating axis driver angle sustaining means including an earth pulley and a Z-axis pulley connected to said earth pulley for sustaining an angle of rotation of said rotating axis driving means to a value equal to said angle of rotation of said axis core.

2. The industrial robot according to claim 1, wherein said core shaft angle sustaining means further includes:
   a base-fixed pulley fixed to the base and having a center approximately coinciding with the center of rotation of said first arm; and
   an earth belt wound around said base-fixed pulley and said planet pulley.

3. The industrial robot according to claim 1 wherein said rotating axis driver angle sustaining means further includes:
   a rotating axis direction regulating pulley connected to said rotating axis driving means; and
   a rotating axis direction regulating belt wound around said rotating axis direction regulating pulley and said earth pulley connected to said planet shaft.

4. An industrial robot comprising:
   a base defining a horizontal plane;
   a first arm supported by said base and rotatable over the horizontal plane with a first end of said first arm in a first longitudinal direction taken as a center of rotation;
   a second arm supported by a second end of said first arm in a second longitudinal direction;
   a rotating axis set in a vertical direction on a first end of said second arm in a longitudinal direction;
   an arm driving unit for rotating said second arm and installed at approximately the center of rotation of said first arm so that rotation thereof relative to said base is prevented;
   a planet shaft for supporting said first and second arms for permitting said first and second arms to rotate relative to each other;

core shaft angle sustaining means including a planet pulley connected to said planet shaft and arranged for sustaining said planet shaft at a constant angle of rotation relative to said base;

axial direction driving means including a Z-axis driving pulley for driving said rotating axis in its axial direction and provided on said second arm for permitting said rotating axis to rotate; and axial direction driver angle sustaining means including a Z-axis pulley and an earth pulley connected to said planet shaft for sustaining an angle of rotation of said axial direction driving means at a value equal to said angle of rotation of said planet shaft.

5. The industrial robot according to claim 4, wherein said core shaft angle sustaining means comprises:

a base-fixed pulley having a center approximately coinciding with the center of rotation of said first arm over said base; and an earth belt wound around said base-fixed pulley and said planet pulley.

6. An industrial robot comprising:

a base defining a horizontal plane;

a first arm supported by said base and rotatable over the horizontal plane with a first end of said first arm in a first longitudinal direction taken as a center of rotation;

a second arm supported by a second end of said first arm in a second longitudinal direction;

a rotating axis set in a vertical direction on a first end of said second arm in a longitudinal direction;

an arm driving unit for rotating said second arm and installed at approximately the center of rotation of said first arm so that rotation thereof relative to said base is prevented;

a planet shaft for supporting said first and second arms for permitting said first and second arms to rotate;

core shaft angle sustaining means including a planet pulley connected to said planet and arranged for sustaining said planet shaft at a constant angle of rotation relative to said base;

rotating axis driving means for rotating said rotating axis and provided on said second arm for permitting said rotating axis driving means to rotate;

rotating axis driver angle sustaining means including an earth pulley and a rotating axis pulley connected to said earth pulley and arranged for sustaining an angle of rotation of said rotating axis driving means at a value equal to said angle of rotation of said axis core;

axial direction driving means including a Z-axis driving pulley for driving said rotating axis in its axial direction and provided on said second arm for permitting said rotating axis to rotate; and axial direction driver angle sustaining means including a Z-axis pulley connected to said earth pulley for sustaining an angle of rotation of said axial direction driving means at a value equal to said angle of rotation of said axis core.

7. The industrial robot according to claim 6, wherein said rotating axis driver angle sustaining means further includes:

a rotating axis direction regulating pulley connected to said rotating axis driving means; and a rotating axis direction regulating belt wound around said rotating axis direction regulating pulley and said earth pulley; and wherein said axial direction driver angle sustaining means further includes an axial direction regulating belt wound around said earth pulley and said axial direction regulating pulley.

* * * * *